Jan. 25, 1938.      J. F. WALLACE      2,106,289
COLLAPSIBLE STRUT
Filed Jan. 30, 1935      3 Sheets-Sheet 1
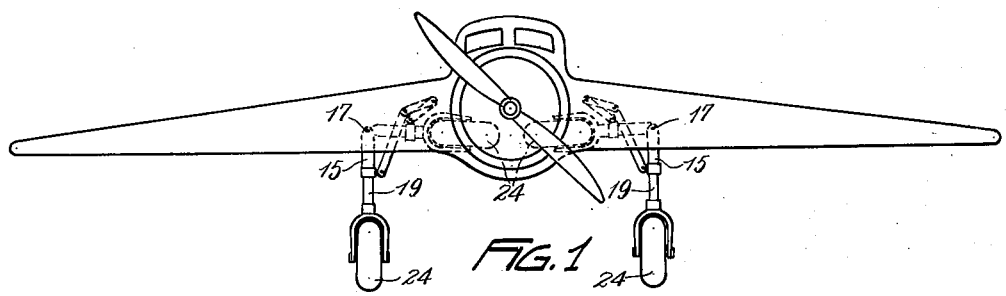
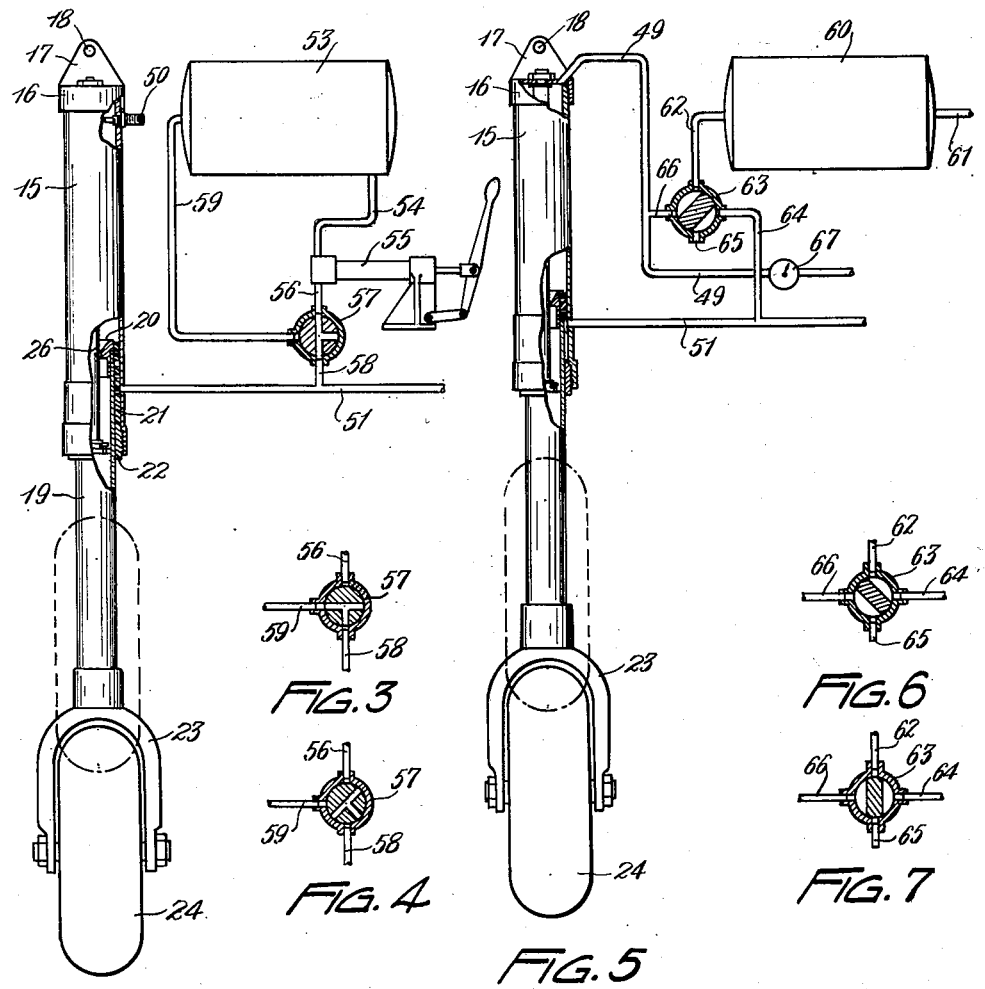
INVENTOR.
John F. Wallace
BY Kwis Hudson & Kent
ATTORNEYS Jan. 25, 1938.  J. F. WALLACE  2,106,289
COLLAPSIBLE STRUT
Filed Jan. 30, 1935   3 Sheets-Sheet 2

INVENTOR.
John F. Wallace
BY Kwis Hudson & Kent
ATTORNEYS

Jan. 25, 1938.  J. F. WALLACE  2,106,289
COLLAPSIBLE STRUT
Filed Jan. 30, 1935  3 Sheets-Sheet 3

INVENTOR.
John F. Wallace
BY
Kwis Hudson & Kent
ATTORNEYS

Patented Jan. 25, 1938

2,106,289

UNITED STATES PATENT OFFICE 2,106,289

COLLAPSIBLE STRUT

John F. Wallace, Cleveland, Ohio, assignor to The Cleveland Pneumatic Tool Company, Cleveland, Ohio, a corporation of Ohio Application January 30, 1935, Serial No. 4,105

9 Claims. (Cl. 244—102)

This invention relates to improvements in collapsible struts, that is to say struts having shock absorbing functions and used in the running gear of airplanes.

It is becoming increasingly the practice to retract the running gear of an airplane after the latter is in the air in order to cut down wind resistance. Sometimes the shock absorbing struts are so long as to make it difficult or inconvenient to provide pockets for them in the fuselage or wing structure. Sometimes also the design of a plane calls for non-retractible struts longer than the needed length of the shock absorber, in order to provide sufficient ground clearance upon landing. In such cases it would be desirable to reduce the over-all length of the struts after the plane is in flight. With these conditions in mind, the principal objects of my invention are:

The provision of airplane running gear wherein the shock absorbing struts may be shortened or collapsed after the plane is in flight.

The provision of airplane running gear wherein the shock absorbing struts may be shortened or collapsed and then folded or swung into pockets in the airplane not large enough to hold the struts in their non-collapsed condition.

The provision of means controllable from the cockpit of an airplane for collapsing the shock absorbers before retracting them, and for putting them into operative condition again when they have been lowered into operative position prior to landing.

The provision of shock absorbing struts of special design adapted for use under the conditions named.

Other objects and features of novelty will appear as I proceed with the description of those embodiments of the invention which, for the purposes of the present application, I have illustrated in the accompanying drawings, in which Fig. 1 is a front elevational view of an airplane provided with running gear embodying the present invention.

Fig. 2 is a diagrammatic view showing in elevation and vertical section one extensible and retractible strut of an airplane running gear, together with liquid connections and apparatus for contracting the strut or permitting its extension.

Figs. 3 and 4 are detail views showing the valve of Fig. 2 in different positions.

Fig. 5 is a view similar to Fig. 2, showing an air system for retracting and expanding the strut.

Figs. 6 and 7 are detail views showing the valve of Fig. 5 in different positions.

Figures 8, 9, 10, 11, 12:
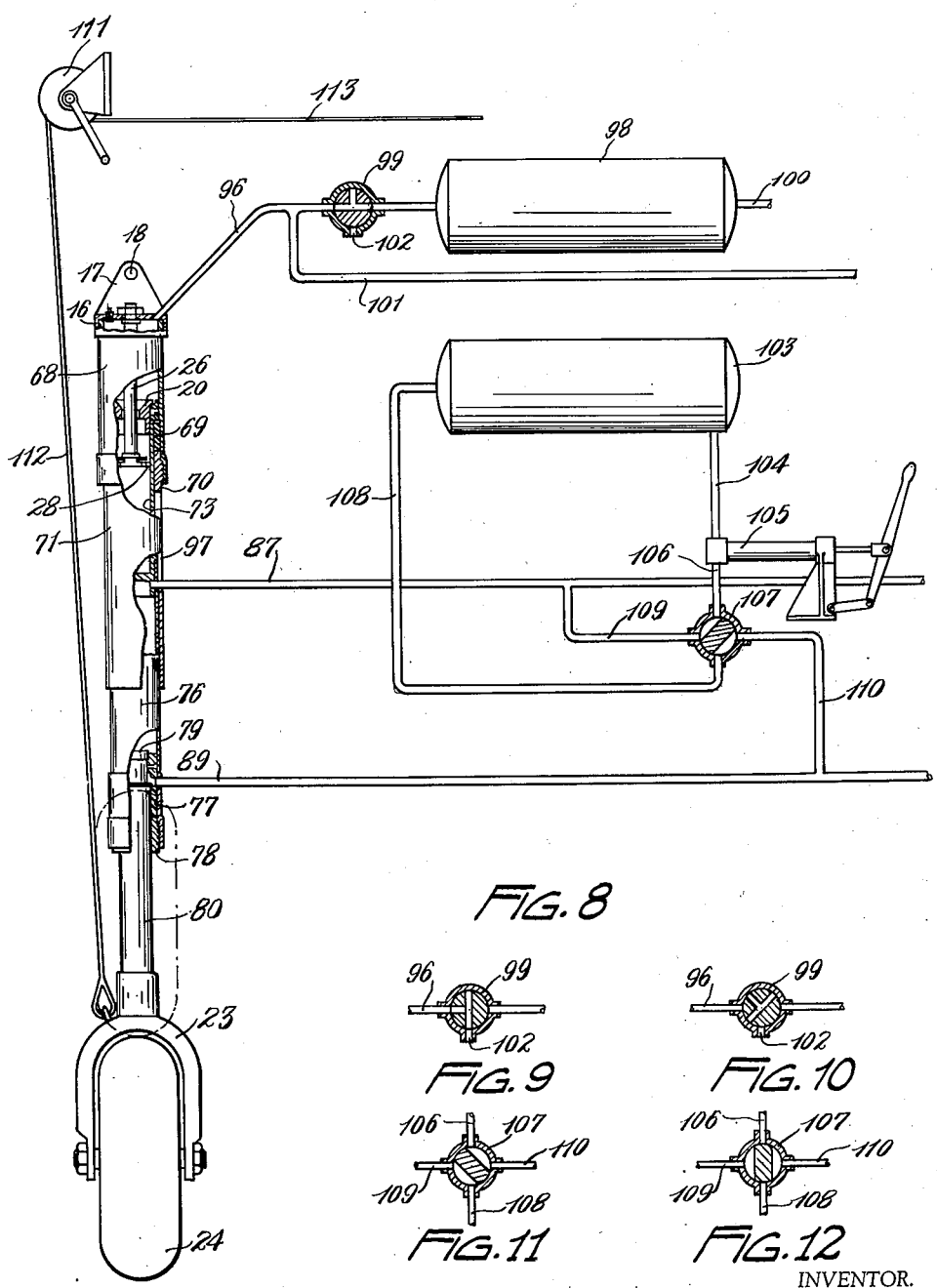
Fig. 8 is a view similar to Figs. 2 and 5, but showing a strut capable of a double extension or contraction, and embodying in its control both compressed air and liquid.
Figs. 9 and 10 are detail views showing the air valve of Fig. 8 in different positions.
Figs. 11 and 12 are detail views showing the liquid valve of Fig. 8 in different positions.

Referring first to the constructions shown in Figs. 2, 3 and 4, 15 is an upper cylinder closed at its upper end by a head or cap 16 which is provided with an upwardly extending ear 17 having a pivot opening 18 therein by means of which the strut or shock absorber may be mounted upon an airplane, as indicated in Fig. 1, so as to be swung from operative or full line position to inoperative or dotted line position. Telescoping with the cylinder 15 there is a lower cylinder 19 of a diameter small enough to be spaced inwardly from the cylinder 15, and provided at its upper extremity with a piston 20 which slides on the inner wall of cylinder 15. At the lower end of cylinder 15 there is a packing 21 bearing on the outer surface of cylinder 19, and retained in place by a gland ring 22. On the lower extremity of the cylinder 19 there is mounted a wheel fork 23 carrying the spindle of ground wheel 24. The fully extended position of the wheel is illustrated in full lines, and the contracted position in dash lines.

Figure 13:
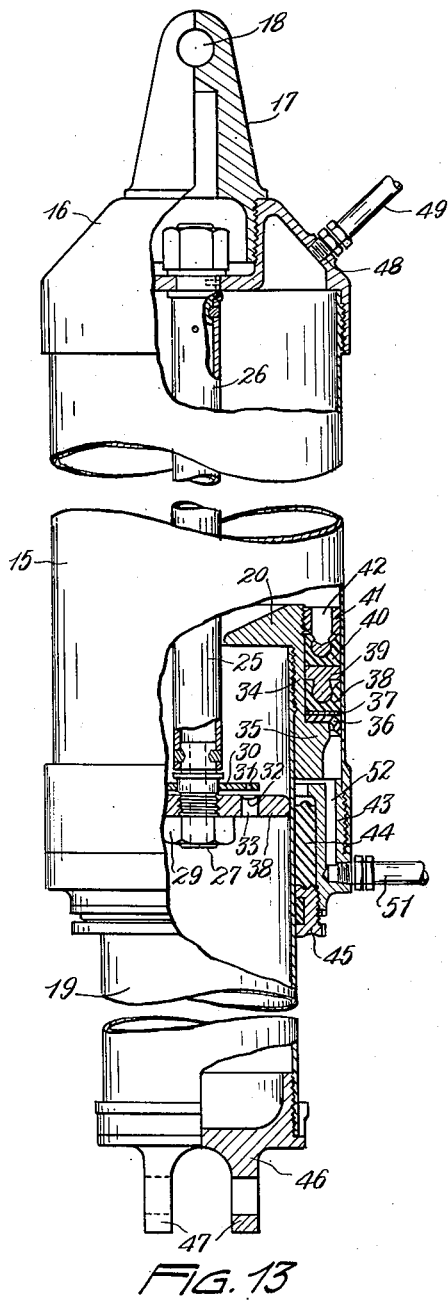
Fig. 13 is an elevational view partly broken away to show some of the elements in vertical section, illustrating a hydro-pneumatic shock absorber which may be employed in connection with the invention.

The shock absorber of Fig. 2 is illustrated rather diagrammatically, but one of similar construction and operation is shown more in detail in Fig. 13. Referring to that figure, it will be observed that the piston 20 has a central opening 25 through which projects a tubular rod 26, the latter being securely mounted at its upper end in the head or cap 16 of the cylinder 15. A plug 27 is set into the lower end of rod 26, and upon this plug there is threaded a disk 28 which has an easy sliding fit within cylinder 19. The disk 28 is held in place by a nut 29. Above the disk 28 on a smooth part of the plug 27 there is slidably mounted an annular valve piece 30, which is provided with one or more restricted openings 31. In the upper surface of disk 28 there is a circular groove 32, and one or more holes 33 are drilled through the disk in such manner as to communicate with the groove 32.

The piston 20 has a skirt portion 34 which may be threaded exteriorly to the cylinder 19, and is provided with a lower shouldered portion 35. Packing of suitable character is interposed between the skirt portion 34 of the piston and the wall of cylinder 15. As illustrated herein it may consist of a cup leather 36, a thin metal ring 37, an annular packing ring 38 of U-shaped cross section, a metal ring 39 having a depending rib extending into the groove of the packing ring 38, a packing ring 40 which is substantially the same as packing ring 38, and a metal ring 41 with an annular rib extending into the groove of packing ring 40, the ring 41 being threaded onto the piston 20 and by adjustment serving to compress the packing to the degree desired. The ring 41 may have holes 42 therein serving both as spanner wrench holes and as holes for admitting oil into the space below the ring 41, which oil being under pressure and acting upon the beveled surfaces of the upper edge of ring 40 tends to force and hold the upper edges of that ring against the surfaces of the piston head 20 and cylinder 15.

In the lower end of the cylinder 15 there is threaded the ring 43. Between this ring and the cylinder 19 I mount packing 44 of any suitable character, and this packing is compressed to the required extent by a gland ring 45. The lower end of cylinder 19 is closed and sealed by any suitable cap or plug, as for instance by the plug 46 having a pair of perforated ears 47, to which may be attached an axle or other means for mounting a ground wheel, skid or the like. As to this detail of construction a somewhat different form is illustrated in Figs. 2 and 5.

The cylinder 15 is an air cylinder, and is provided with a threaded opening 48 in which there may be mounted the usual air valve, or if desired a nipple may be mounted in this opening for connection with an air hose or tube 49. An air valve in a similar location is indicated at 50 in Fig. 2. Cylinder 19 is filled with oil or other liquid, the liquid preferably extending upwardly a short distance above the piston 20 into cylinder 15.

A hose or other tubular conductor 51 is connected into ring 43, and communicates with a passage 52 in that ring, whereby liquid may be received from the conductor 51 into the space below the annular shouldered portion 35 of the piston 20, the packing in the piston, and particularly the cup leather 36, serving to prevent the leakage of liquid upwardly out of the annular chamber surrounding the cylinder 19 below the piston head.

When the air in the air cylinder 15 is exhausted or the pressure therein dissipated, oil or other liquid may be forced through conductor 51 into the annular chamber beneath the piston which, with the cylinder 19, will thereby be forced upwardly to collapse the shock absorber and decrease its length materially.

In the operation of this shock absorber any shock or impact delivered to cylinder 19 causes the latter to rise against the air cushion in cylinder 15, by which the shock is absorbed or cushioned. During this impact stroke oil is forced upwardly through the openings 33, lifting valve piece 30, as indicated in Fig. 13. Sufficient clearance is provided between the tubular rod 26 and the opening 25 in piston 20 to permit the oil displaced by the increasing length of rod 26 within the cylinder 19 to be forced into the cylinder 15. On the rebound the valve piece 30 immediately seats itself, cutting off free admission to passages 33 and necessitating the metering of oil through the restricted passage or passages 31, thereby checking the rebound stroke.

Now referring again to Fig. 2, 53 is a storage tank for oil or other liquid, the tank being located in some convenient position in the airplane. From this tank a conductor 54 extends to a hydraulic pump 55. From this pump another conductor 56 leads to a three-way valve 57. From this valve a conductor 58 extends to the conductor 51, which is joined to the strut illustrated in Fig. 2 and also to the similarly arranged strut on the opposite side of the fuselage. A further conductor 59 connects the valve with the tank and constitutes a return line.

It is to be understood that the air cylinder 15 is inflated by air under pressure introduced through the valve 50. The normal position of valve 57 is that illustrated in Fig. 4, whereby the conductors 58 and 51 are cut off from the pump 55 and from the tank 53. Now, when the airplane takes off, the air pressure immediately extends the strut to the condition illustrated by full lines in Fig. 2. The pilot may then turn the valve 57 to the position illustrated in Fig. 2 and operate the pump 55, drawing liquid from the tank 53 and forcing it through valve 57 and conductors 58 and 51 to the two struts below the pistons 20 thereof. The pistons will thereby be forced upwardly, compressing the air in the air cylinders 15. The pumping is continued until the cylinder 19 is drawn up into the cylinder 15 as far as it will go. Valve 57 is then turned to the position of Fig. 4. The pilot then operates any suitable controls to swing the struts 15, 19 on their pivots to retract the same with the ground wheels into inoperative position, as illustrated for instance in dotted lines in Fig. 1. Obviously the conductor 51 must be flexible, at least in part.

Now, when a landing is to be made, the pilot by operating suitable controls known in the art will swing the struts 15, 19 back to their vertical or substantially vertical positions. He will then turn valve 57 to the position illustrated in Fig. 3, whereby the heavy pressure in air cylinder 15 will become effective to force the piston 20 and piston rod 19 downwardly, causing the liquid in the annular chambers around the piston rods 19 to be forced through conductors 51 and 58, through valve 57, and thence through conductor 59 back to tank 53. As soon as this movement is completed, that is when the pistons 20 have descended as far as they can go the valve 57 is again turned to the position of Fig. 4. The oil lines 51 and 58 will then be filled with oil, and the action of the shock absorber will be the same as though there were no such connections.

In Fig. 5 I have illustrated another form of the invention, wherein the shock absorber itself may be nearly identical with that of Fig. 2, with possibly some variation in the packing around the piston head, and with the use of the air conductor 49 instead of the air valve 50. In this case air pressure is used to collapse the strut. An air tank 60 is mounted in the airplane in a convenient position. It is designed to hold air under pressure furnished through a conductor 61 from an air compressor of any suitable character driven by any suitable means. From the air tank a conductor 62 leads to a four-way valve 63. From this valve there is a conductor 64 which is connected with the conductor 51, previously referred to. The valve has a port 65 open to atmosphere, and also is connected by a conductor 66 with the conductor 49 which is connected with the struts on both sides of the machine, and must be flexible at least in part.

The normal position of valve 63 is the completely closed position illustrated in Fig. 7. When the airplane takes off and is in flight, the pilot turns valve 63 to the position illustrated in Fig. 6, whereupon the air chambers in the two cylinders 15 are connected to atmosphere through conductors 49 and 66 and through valve 64 and open port 65. At the same time air tank 60 is connected through conductor 62, valve 63 and conductors 64 and 51 with the annular chambers surrounding the piston rods 19 under pistons 20. The pistons and piston rods are thereby forced upwardly to the limits of their movement, when the valve 63 is again turned to closed position, as in Fig. 7, thereby sealing the air pressure in the struts beneath the pistons and holding them in the elevated positions. The struts can then be swung into the dotted line positions of Fig. 1.

When a landing is to be made the struts are lowered to their upright positions, and the pilot turns valve 63 to the position illustrated in Fig. 5, whereupon the annular chambers beneath the pistons in the two struts are vented to atmosphere through conductors 51 and 64, valve 63, and open port 65. At the same time air pressure is delivered to the upper air chambers in both struts from air tank 60 through conductor 62, valve 63, conductor 66 and conductor 49. The inflation of the air chambers continues until the desired pressure is obtained. The pressure can be tested by turning the valve 63 to closed position and noting the reading on a pressure gauge 67 in the conductor 49. When the desired inflation is completed the valve 63 is turned to closed position, as indicated in Fig. 7, and the struts will then be in condition for landing or taxiing.

Figure 14:
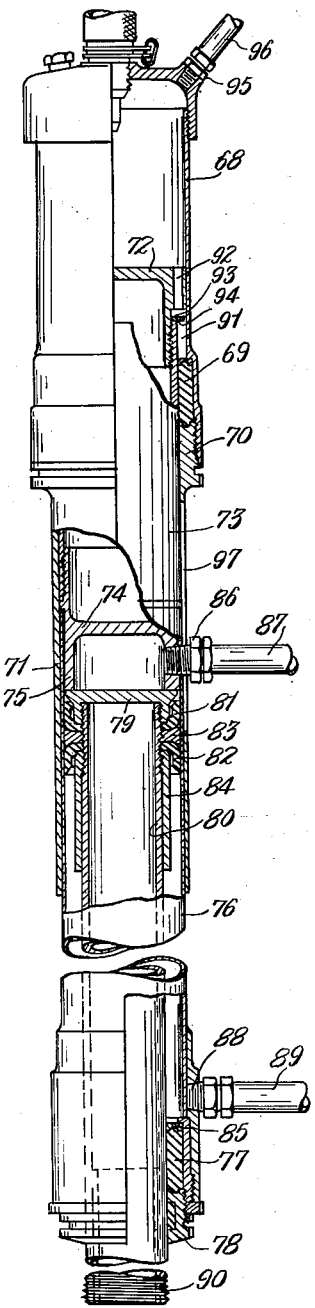
Fig. 14 is a similar view of a different form of shock absorber.

In connection with the form of the invention illustrated in Fig. 8, a strut capable of double expansion and double contraction is employed. An example of such a strut is illustrated in Fig. 14, where the upper cylinder is shown at 68. This cylinder near its lower end is provided with a packing 69 which is held in place and in suitable compression by a gland nut 70, the latter being formed at the upper end of a sleeve 71 which in effect constitutes an extension of cylinder 68, although it is of smaller diameter than that cylinder.

Within the cylinder 68 there is slidably mounted a piston 72 threaded into the upper end of a tubular piston rod 73. The lower part of this tubular rod has sliding engagement with the sleeve 71. The tubular rod 73 is closed at its lower end by a cap or plug 74 which has a downwardly extending skirt 75. To this same plug there is welded or otherwise secured a depending cylindrical member 76 in the lower end of which is mounted a packing 77 held in place by gland nut 78. The cylinder 76 is therefore an extension of the tubular piston rod 73, although the plug 74 cuts off any communication between them.

Within the cylinder 76 I mount a piston 79 and a tubular piston rod 80. The movements of these elements with respect to the cylinder 76 have no shock absorbing functions, but by means of such relative movement the effective length of the strut may be changed, that is increased for operation and shortened for flight.

The piston 79, it will be observed, is provided with a pair of oppositely extending cup leathers 81 and 82 separated by a metal ring 83 which is threaded onto the tubular rod 80. 84 is a sleeve mounted on the tubular rod 80, the lower end of which is adapted, when this part of the strut is expanded, to engage a slidable metal ring 85 contacting with the upper end of packing 77. When the sleeve 84 is pressed against the ring 85 with considerable force the packing 77 is thereby compressed longitudinally and expanded transversely, thereby more effectively sealing the joint and preventing more certainly the leakage of oil.

A nipple 86 extends through a hole in cylinder 76 and is threaded into an aligned hole in the depending skirt 75 of plug 74. To this nipple an oil conductor pipe 87 is connected. A nipple 88 is mounted in the reenforced lower end of cylinder 76 and has connected therewith an oil conductor 89. Obviously, when oil is forced into the upper end of the cylinder 76 through conductor 87, the piston 79 and piston rod 80 will be forced downwardly and the length of the strut accordingly increased. On the other hand, when oil in the upper end of the cylinder is free to exhaust and oil is forced into the lower end through conductor 89, the piston will be raised and the strut will be shortened. The lower end 90 of piston rod 80 is threaded for connection with a suitable mounting for a wheel or skid. For example, the wheel fork 23 may be threaded into this lower end.

The shock absorber preferably comprises means for checking rebound, which in this case may comprise an annular oil chamber 91, passages 92 leading from the chamber to the upper surface of the piston head 72, and a ring valve 93 slidable upon the piston head. Clearance is provided between the periphery of this ring valve and the cylinder wall to permit rapid flow of oil into the chamber on the impact stroke. The ring has one or more constricted openings 94 therein, through which oil must be metered when the flow is out of the chamber 91 on the rebound stroke. By this means the rebound is checked, as will be apparent to those skilled in the art.

In the upper end of cylinder 68 there is mounted a nipple 95 to which is connected a conductor 96 for the admission and discharge of compressed air.

Assuming that the strut is expanded, that is by oil in the cylinder 76 above the piston head 79, the latter being at the bottom of its possible travel, and assuming that a shock of impact is delivered to the lower end of piston rod 80, the force of that shock will then be transmitted to the non-compressible liquid above the piston 79 and thence to the plug 74 and the tubular piston rod 73. The compressed air in cylinder 68 will yield, and all of the parts 80, 79, 74, 73 and 72 will travel upwardly, further compressing the air in cylinder 68. The impact will thereby be cushioned. As soon as the upward stroke is brought to a stop position by the increased pressure in cylinder 68, the air begins to expand and the piston 72 is forced downwardly. At this time however the annular chamber 91 is full of oil which has no path of exit except through the constricted opening or openings 94, and consequently the rebound stroke is checked. During both of these movements of the tubular rod 93, the nipple 86 must move also. In order to permit such movement a slot 97 is formed in the cylinder 91. The conductors 96, 87 and 89 must of course be flexible, or include flexible portions.

Referring now to Fig. 8, it will be noted that there are some differences between the strut there illustrated and that in Fig. 14, just described, but the functions of the two struts are the same, and their connections with the air and oil conductors 96, 87 and 89 are similarly arranged. In Fig. 8 I have shown a compressed air tank 98, to which the conductor 96 is connected through a valve 99. The tank also has a connection 100 leading to any suitable air compressor. A conductor 101 branching from conductor 96 is connected with the air chamber of the shock absorber on the opposite side of the airplane at a point corresponding with that of the connection of conductor 96 herein illustrated. The valve 99 has a port 102 leading to atmosphere. Normally the valve 99 will occupy the position illustrated in Fig. 10, whereby all flow of air is cut off. When it is desired to inflate the air chambers of the two struts, the valve is turned to the position of Fig. 8, the flow of compressed air taking place from tank 98 through valve 99 and conductors 96 and 101. When the air pressure in the two cylinders 68 is to be dissipated however, preparatory to contracting the strut, the valve 99 is turned to the position illustrated in Fig. 9, at which time the air tank connection is cut off and the conductors 96 and 101 are connected with atmosphere through port 102.

A suitable tank for oil is shown at 103, connected by a conductor 104 with a liquid pump 105, which in turn is connected by a conductor 106 with a four-way valve 107. There is also a conductor 108 leading from the tank to the valve. Conductor 87 joins the two struts of the airplane at corresponding points. This conductor is in turn connected by a conductor 109 with valve 107. Conductor 89 also joins corresponding parts of the two struts, and is connected by a conductor 110 with valve 107 as shown.

The normal position of valve 107 is that illustrated in Fig. 12, where all four conductors are cut off from each other. When it is desired to contract the strut, as when the plane is in flight, the pilot turns valve 107 to the position illustrated in Fig. 11. Oil is then free to flow from the upper end of cylinder 76 and the upper end of the corresponding cylinder on the other side of the plane, through conductors 87 and 109 to valve 107 and out through conductor 108 back to oil tank 103. The pilot then causes pump 105 to be operated, drawing oil from tank 103 through conductor 104 and forcing it through conductor 106, valve 107, conductors 110 and 89 into the two cylinders 76 beneath the pistons 79 outside of the tubular rods 80. The pistons 79 and their rods 80 are thereby caused to rise, and this operation may be continued until the piston has risen to the limit of its motion, when the pilot turns the valve 107 to the position of Fig. 12.

Now, when it is desired to expand the strut again preparatory to landing, the valve 107 is turned to the position of Fig. 8 and the pump 105 operated. Oil will then be drawn from the oil tank and pumped through the valve and conductors 109 and 87 to the upper ends of cylinders 76 while oil is exhausted from the lower ends of those cylinders through conductors 89 and 110, valve 107 and conductors 108 back to tank 103.

If it is desired to make use of the double contraction of the strut, the pistons 79 and piston rods 80 are raised by the oil system just described, and the air is exhausted from air cylinder 68 as previously described. Then the pilot operates a winch 111 mounted in the cockpit to wind up two cables or the like 112 and 113 connected at their outer extremities with the respective wheel forks 23, thereby pulling upwardly on the piston rod 80, from which effort is transmitted to plug 74 and thence to tubular rod 73. The latter with its piston 72 is thereby lifted to the upper limit of its motion, accomplishing the double contraction of the strut. Thereafter the struts may be swung up into pockets in the airplane in any known manner if desired.

Having thus described my invention, I claim:

1. In an airplane, a pair of hydro-pneumatic shock absorbers pivotally mounted at their upper ends, a ground engaging member mounted on the lower end of each shock absorber and carried thereby exclusively, means controllable from the cockpit of the airplane for contracting the shock absorbers, and means for swinging the contracted shock absorbers upon their pivots in planes normal to the pivots through approximately a right angle into inoperative position.

2. In an airplane, a pair of fluid shock absorbers pivotally mounted at their upper ends upon the airplane, a ground engaging member mounted on the lower end of each shock absorber and carried thereby exclusively, each shock absorber having pneumatic means adapted to cushion shocks of impact and liquid metering means adapted to check rebound, said shock absorber having a chamber entirely separate from said shock absorbing and rebound checking means adapted when expanded to contract the shock absorber, means controllable from the cockpit of the airplane for injecting liquid into said chamber, and means for swinging the contracted shock absorbers upon their pivots into inoperative position.

3. In an airplane, running gear comprising a shock absorber containing an air cylinder, a piston movable therein, a piston rod for said piston, said shock absorber having an annular chamber surrounding the piston rod closed at one end by the piston and at the other end by the cylinder, and means operable from the cockpit of the plane for forcing incompressible fluid into said annular chamber for imparting movement to the piston inwardly with respect to the said air cylinder and compressing the air in said air cylinder, whereby the strut is collapsed, and for withdrawing incompressible fluid from said annular chamber, whereby the air is again free to expand the shock absorber to operative position.

4. In a fluid shock absorber, a pair of telescoping cylinders each closed at its outer end, means within said telescoping cylinders for absorbing shocks of impact and rebound and an extension for one of said telescoping cylinders comprising a cylinder, piston and piston rod, and means for pumping liquid into said last named cylinder above or below said piston, whereby the length of the said extension may be varied.

5. In an airplane, a shock absorbing strut hingedly mounted at its upper end, a ground wheel mounted solely upon the lower end of the strut, and means operable from the cockpit of the plane for contracting said strut, said airplane having a pocket therein adapted to receive the wheel after the strut has been contracted and is swung upwardly on its hinge mounting.

6. In combination, a hydro-pneumatic shock absorber comprising an air chamber in which air takes shocks of impact and a liquid chamber from which liquid is metered to check rebound, and a third chamber out of communication with both of said first named chambers and unaffected by the action of the fluid in said first named chambers, said shock absorber being adapted to be contracted upon the expansion of said third chamber and to be extended upon the contraction of said third chamber.

7. In an airplane, running gear comprising shock absorbers mounted at their upper ends on hinge pins extending longitudinally of the airplane, the mounting of the shock absorbers being otherwise immovable, ground wheels carried by the lower ends of the shock absorbers, means operable from the cockpit of the plane for contracting or expanding said shock absorbers, and means operable from the cockpit of the plane for swinging the running gear about said hinge mountings after the shock absorbers have been contracted.

8. In an airplane, a pair of fluid shock absorbers, a ground engaging member mounted on the lower end of each shock absorber, each shock absorber comprising a fluid cylinder and a piston movable therein, each shock absorber comprising also a further cylinder and piston, and means controllable from the cockpit of the airplane for forcing incompressible fluid into said last named cylinder to one side of the piston and exhausting it from the other, whereby the length of the shock absorber may be varied without affecting the shock absorbing action.

9. In an airplane, running gear comprising shock absorbers hingedly mounted at their upper ends, said shock absorbers occupying an approximately vertical operative position, ground wheels carried exclusively by the lower ends of said shock absorbers, means operable from the cockpit of the airplane for expanding or contracting said shock absorbers, and means operable from the cockpit of the airplane for swinging said shock absorbers upon their hinges, said airplane having pockets adapted to receive the raised running gear when the shock absorbers are contracted only.

JOHN F. WALLACE.